US009670909B2

(12) United States Patent
Hölscher

(10) Patent No.: US 9,670,909 B2
(45) Date of Patent: Jun. 6, 2017

(54) WIND TURBINE FOUNDATION AND WIND TURBINE

(71) Applicant: Wobben Properties GmbH, Aurich (DE)

(72) Inventor: Norbert Hölscher, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 14/912,020

(22) PCT Filed: Aug. 5, 2014

(86) PCT No.: PCT/EP2014/066823
§ 371 (c)(1),
(2) Date: Feb. 12, 2016

(87) PCT Pub. No.: WO2015/024772
PCT Pub. Date: Feb. 26, 2015

(65) Prior Publication Data
US 2016/0201653 A1    Jul. 14, 2016

(30) Foreign Application Priority Data
Aug. 19, 2013  (DE) .................. 10 2013 216 343

(51) Int. Cl.
*E02D 27/42* (2006.01)
*F03D 11/04* (2006.01)

(52) U.S. Cl.
CPC .......... *F03D 11/045* (2013.01); *E02D 27/425* (2013.01); *E02D 2600/20* (2013.01); *E02D 2600/40* (2013.01)

(58) Field of Classification Search
CPC . F03D 11/045; E02D 27/425; E02D 2600/40; E02D 2600/20
USPC ......... 52/169.9, 294, 296, 297, 223.3, 223.7
See application file for complete search history.

(56) References Cited

U.S. PATENT DOCUMENTS

| 5,586,417 | A | * | 12/1996 | Henderson | ............. | E02D 27/42 |
| | | | | | | 405/233 |
| 6,672,023 | B2 | * | 1/2004 | Henderson | ............. | E02D 27/42 |
| | | | | | | 405/244 |
| 8,534,958 | B2 | | 9/2013 | Reichel et al. | | |
| 2004/0148880 | A1 | * | 8/2004 | Hayes | ...................... | E04C 5/12 |
| | | | | | | 52/223.1 |
| 2007/0181767 | A1 | * | 8/2007 | Wobben | .................. | E02D 27/42 |
| | | | | | | 248/346.01 |
| 2010/0132270 | A1 | | 6/2010 | Willey et al. | | |
| 2010/0154318 | A1 | * | 6/2010 | Shockley | .................. | E04B 5/43 |
| | | | | | | 52/82 |

(Continued)

FOREIGN PATENT DOCUMENTS

| CN | 1784528 A | 6/2006 |
| CN | 202969409 U | 6/2013 |

(Continued)

*Primary Examiner* — Brian Glessner
*Assistant Examiner* — Adam Barlow
(74) *Attorney, Agent, or Firm* — Seed Intellectual Property Law Group LLP

(57) ABSTRACT

A wind energy plant foundation is provided with a plurality of ready-made concrete foundation segments. The foundation segments have a plurality of first and second sheaths which serve to receive tension wires for bracing the foundation segments.

4 Claims, 2 Drawing Sheets

(56) References Cited

U.S. PATENT DOCUMENTS

| | | | |
|---|---|---|---|
| 2011/0061321 A1* | 3/2011 | Phuly | E02D 27/42 52/297 |
| 2011/0299937 A1 | 12/2011 | Cortina-Ortega et al. | |
| 2012/0047830 A1* | 3/2012 | Phuly | E02D 27/42 52/294 |
| 2012/0167499 A1* | 7/2012 | Knisel | F03D 13/22 52/231 |
| 2013/0255169 A1* | 10/2013 | Henderson | E04C 5/125 52/223.13 |
| 2014/0033628 A1* | 2/2014 | Lockwood | E04H 12/16 52/223.5 |
| 2015/0096240 A1* | 4/2015 | Arlab n Gabeiras | F03D 1/001 52/40 |
| 2015/0330077 A1* | 11/2015 | Stracke | E04H 12/16 52/173.1 |
| 2015/0361965 A1* | 12/2015 | Jimeno Chueca | F03D 1/001 405/200 |
| 2015/0376859 A1* | 12/2015 | Phuly | F03D 13/22 52/223.1 |

FOREIGN PATENT DOCUMENTS

| | | |
|---|---|---|
| DE | 4037438 A1 | 5/1992 |
| DE | 102008041849 A1 | 3/2010 |
| JP | 2006-526095 A | 11/2006 |
| JP | 2009-57713 A | 3/2009 |
| JP | 2011-17245 A | 1/2011 |
| WO | 2004101898 A2 | 11/2004 |
| WO | 2011030199 A2 | 3/2011 |
| WO | 2011110749 A1 | 9/2011 |

* cited by examiner

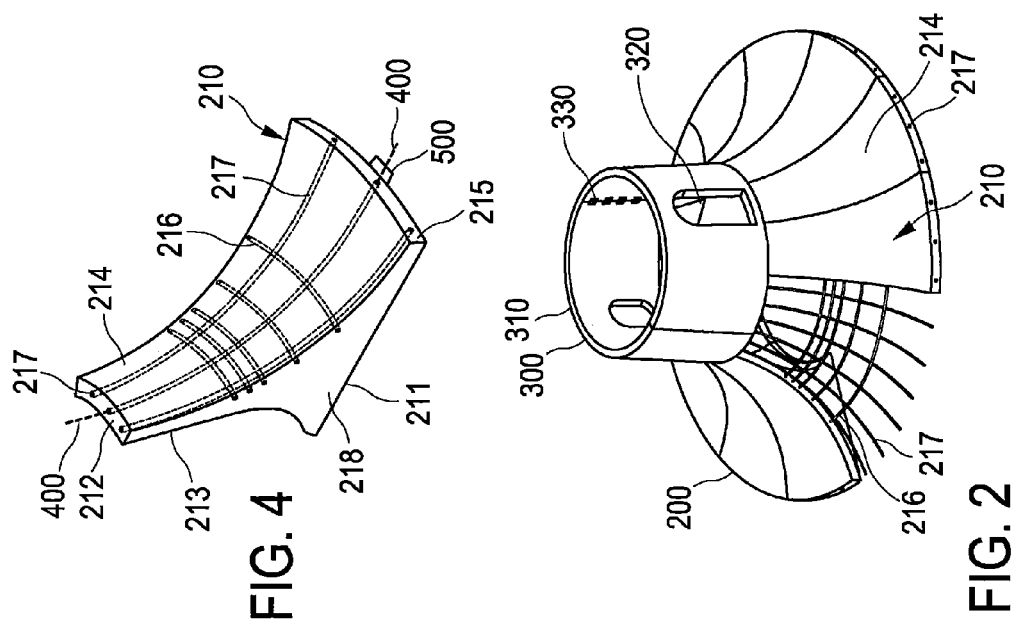
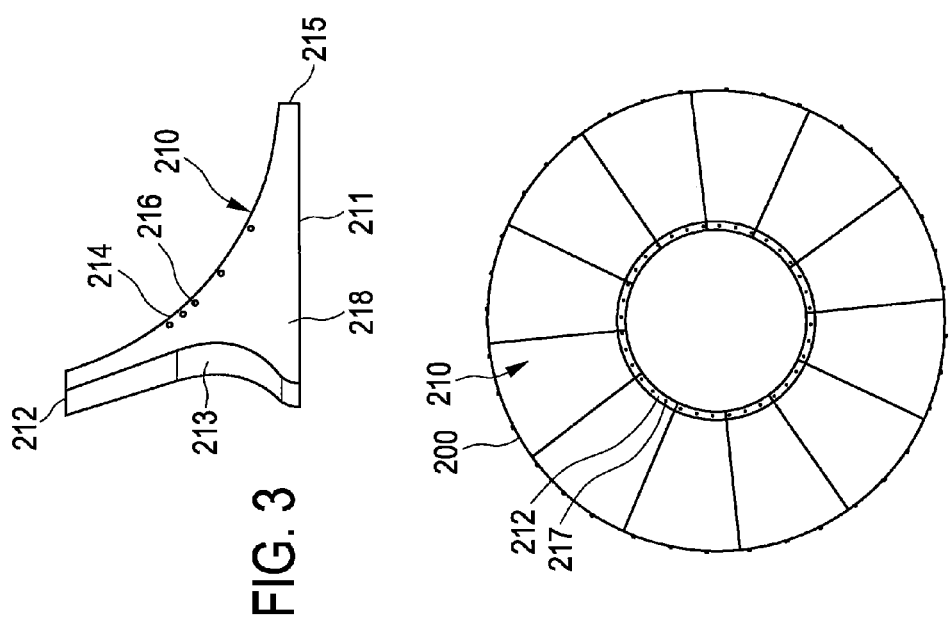

WIND TURBINE FOUNDATION AND WIND TURBINE

BACKGROUND

Technical Field

The present invention relates to a wind energy plant foundation as well as to a wind energy plant.

Description of the Related Art

The foundations of wind energy plants are of great importance since the wind energy plant is to have a service life of at least 20 years. Foundations for wind energy plants are typically made by excavating a construction trench, penetrating a granular sub-grade course, erecting a foundation installation part, carrying out the necessary reinforcement works, and finally filling the trench with cement. The foundations are thus more typically cast in situ by site-mixed concrete and the quality of the foundation is dependent on the climatic conditions at the erection site.

WO 2004/101898 reveals a foundation of a wind energy plant which is constructed by prefabricated ready-made concrete parts. The foundation has for this purpose a hollow cylindrical base element with a plurality of radially spaced foot modules. The foot modules are braced on the base module as well as with one another.

BRIEF SUMMARY

One or more embodiments of the present invention are directed to a wind energy plant foundation as well as a corresponding wind energy plant, which includes a plurality of prefabricated ready-made concrete parts and has improved statics.

Thus a wind energy plant foundation is provided having a plurality of ready-made concrete foundation segments. The foundation segments have a plurality of first and second sheaths which serve to receive tensioning wires for bracing the foundation segments.

The foundation segment has an underneath side, an upper side for receiving a lower tower segment, an inner side, an inwardly curved outer side, two side faces and an outer section.

First sheaths extend in the peripheral direction or parallel to the underneath side. Second sheaths extend between the outer section and an upper side of the foundation segment or parallel to the side faces.

According to a further aspect of the present invention the second sheaths follow a curvature of the outside.

According to a further aspect of the present invention the foundation has a number of segment anchors on the outer section in the region of the ends of the second sheaths for receiving an end of a tension wire for bracing the foundation segment.

The foundation segments can have the form of a circular ring segment.

The invention likewise relates to a wind energy plant having a wind energy plant foundation as described above. The foundation segments are braced by tension wires in the first and/or second sheaths.

According to one aspect of the present invention at least one lower tower segment is placed on the foundation so that it is braced together with the plurality of the foundation segments via tension wires in the second sheaths.

One or more embodiments of the invention relate to an idea of providing a wind energy plant foundation from a plurality of prefabricated ready-made concrete parts. The ready-made concrete parts have a plurality of sheaths. To mount the foundation, tension wires are introduced into the sheaths and the ready-made concrete parts of the foundation are braced together through the tension wires. Bracing is thereby undertaken via the ready-made foundation. The bracing, for example by means of the tension wires, runs optionally through the ready-made concrete segments up to the foot of the segment, where a segment anchor can be provided for bracing, by way of example.

Further configurations of the invention form the subject of the dependent claims.

BRIEF DESCRIPTION OF THE SEVERAL VIEWS OF THE DRAWINGS

Advantages and embodiments of the invention will now be explained in further detail below with reference to the drawing.

FIG. 2 shows a diagrammatic illustration of a foundation of a wind energy plant according to a first embodiment;

FIG. 3 shows a diagrammatic illustration of a foundation segment according to the first embodiment;

FIG. 4 shows a further diagrammatic view of a foundation segment according to the first embodiment; and FIG. 5 shows a plan view of a wind energy plant foundation according to the first embodiment.

DETAILED DESCRIPTION

Figure 1:
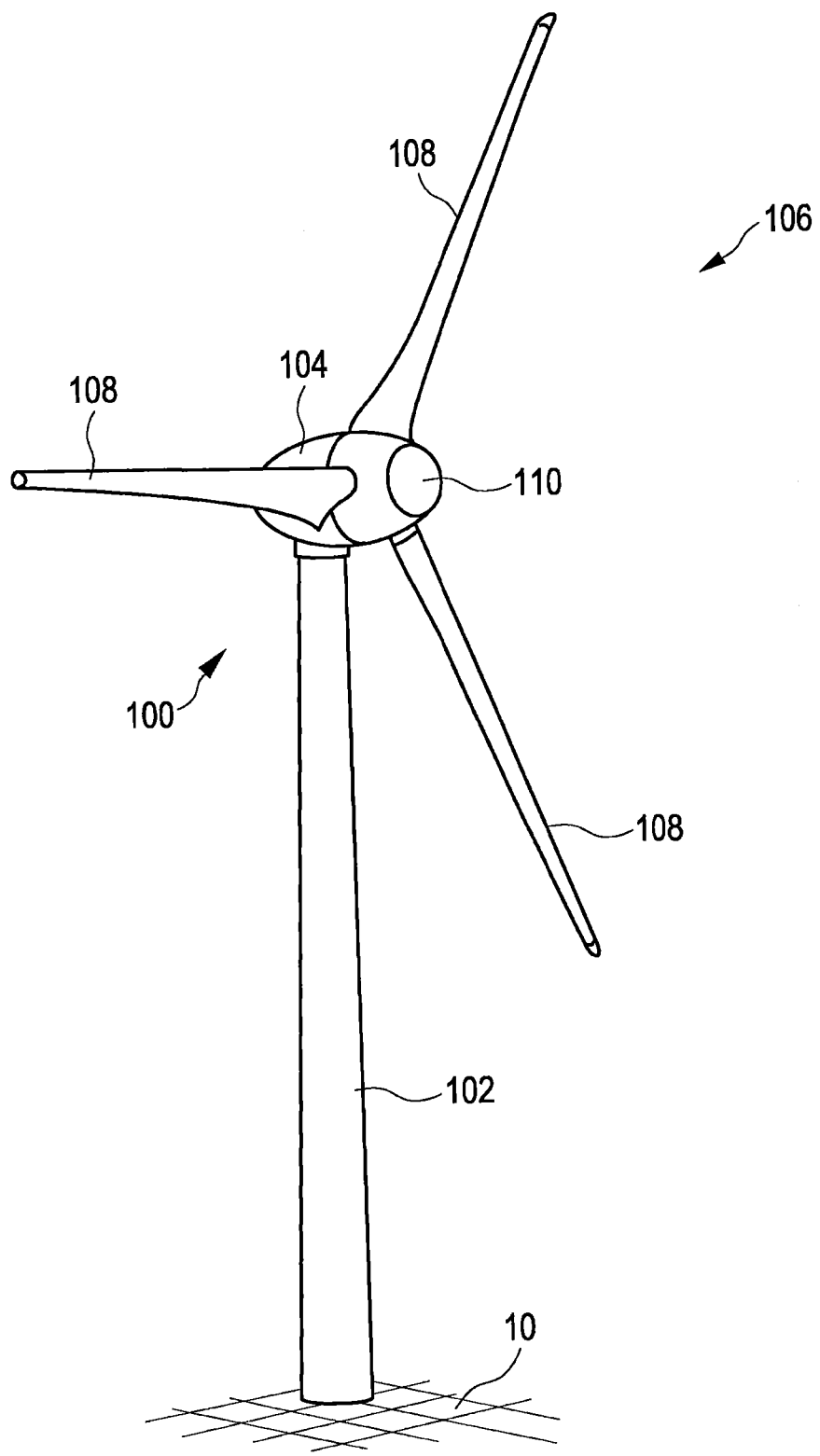
FIG. 1 shows a diagrammatic illustration of a wind energy plant according to the invention.

FIG. 1 shows a diagrammatic illustration of a wind turbine or wind energy plant 100 according to the invention. The wind energy plant 100 has a tower 102 and a nacelle 104 on the tower 102. An aerodynamic rotor 106 having three rotor blades 108 and a spinner 110 is provided on the nacelle 104. During operation of the wind energy plant the aerodynamic rotor 106 is set in a rotational movement through the wind and thus also turns a rotor or racer of a generator which is coupled directly or indirectly to the aerodynamic rotor 106. The electric generator is mounted in the nacelle 104 and generates electric energy. The pitch angle of the rotor blades 108 can be changed by pitch motors on the rotor blade roots of the relevant rotor blades 108.

FIG. 2 shows a diagrammatic illustration of a foundation of a wind energy plant according to a first embodiment. The foundation 200 has a plurality of foundation segments 210. The foundation segments 210 are placed side by side and thus form the foundation 200. The foundation segments 210 can be configured as circular ring segments, as circle sectors or circular cut-outs. The foundation segments 210 have first and second sheaths 216, 217. The first sheaths 216 extend in the transverse direction and the second sheaths 217 extend in the longitudinal direction of the foundation segment 210. The foundation segments 210 can be braced by means of the first and sheaths 216, 217 with the aid of tension wires 400 (FIG. 4).

The foundation 200 can also be configured as an octagon or polygon. In this case, the foundation 200 can include n-number of foundation segments 210.

A lower tower segment or by way of example a door segment 300 can be placed on an upper end of the foundation, i.e., on the upper side. Optionally the lower tower segment or the door segment 300 can be braced together with the foundation segments 210.

The first sheaths 216 are used to receive the tension wires 400 in order to brace the adjacent foundation segments to one another. The second sheaths 217 are used to brace the foundation segments 210 optionally at least to a lower tower segment 300 by means of tension wires. The foundation segments 210 can optionally be braced with a plurality of tower segments placed one on the other.

If the tower of the wind energy plant is a tower of ready-made concrete parts, then the pre-formed concrete part segments can optionally be braced together with the foundation segments 210 in one continuous process.

FIG. 3 shows a diagrammatic illustration of a foundation segment according to the first embodiment. The foundation segment has an underneath side 211, an upper side 212, an inside 213, an outside 214 and an outer section 215 in the region of the lower side 211. The inside 213 is curved outwards and the outside 214 is curved inwards. In the region of the outside 214 there is a plurality of first sheaths 216. These first sheaths 216 can extend optionally substantially parallel to the underneath 211 of the segment. The foundation segment 210 has two straight ends 218 as side faces. By means of the side faces 218 the adjoining foundation segments can be placed side by side and then braced by means of tension wires 400 which are guided through the first sheaths. Tension anchors 500 (FIG. 4) can be provided on the outer sections in the region of the ends of the second sheaths 217, in order to brace the tension wires 400.

FIG. 4 shows a further diagrammatic illustration of a foundation segment 210 according to the first embodiment. The foundation segment 210 has a preferably planar underneath side 211, an upper side 212, an outwardly curved inside 213, an inwardly curved outside 214, two straight side faces 218 as well an outer section 215. The foundation segment 210 furthermore has a plurality of first sheaths 216 which are provided substantially parallel to the underneath side 211. Furthermore the foundation segment 210 has a number of second sheaths 217 which are configured substantially parallel to the side faces 218.

FIG. 5 shows a diagrammatic plan view of a foundation 200 according to the first embodiment. The foundation 200 includes a plurality of foundation segments 210. A plurality of second sheaths open on the upper side 212 of the foundation segments 210.

The second sheaths 217 can optionally follow the curvature of the outside 214 of the foundation segments 210. Furthermore the first sheaths 210 can follow the curvature of the circular segment shaped foundation segments 210 so that the relevant ends of the first sheaths 216 coincide on the side faces 218 with the relevant free ends of the first sheaths of the side faces 218 in adjoining foundation segments 210 so that tension wires can be guided through the first sheaths 216 to brace the foundation segments.

The invention likewise relates to a wind energy plant having a foundation according to the first embodiment and with a tower which has a plurality of tower segments. At least the lowermost tower segment can be braced by means of tension wires and the second sheaths 217 with the respective foundation segments 210 of the foundation 200. Segment anchors for example can hereby be coupled at the ends of the second sheaths 217 in the outside section 215.

The diameter of the upper end 212 of the foundation 200 is smaller than the diameter of the assembled outside sections 215 of the foundation segments 210. The diameter of the upper end 212 of the assembled foundation segments 210 corresponds to the diameter of the lower end of a lower tower segment 300.

The invention claimed is:

1. A foundation for receiving a wind energy plant tower with a plurality of tower segments, the foundation comprising:
a plurality of pre-formed concrete foundation segments, each foundation segment having a plurality of first and second sheaths that are configured to receive tension wires for bracing the foundation segments, wherein each foundation segment has an under side, an upper side configured to receive a lower tower segment of the plurality of foundation segments, an inner side, an outer side having an inward curvature substantially over its entire surface, two side faces and an outer section, wherein the plurality of first sheaths extend parallel to the under side of the foundation segment and the plurality of second sheaths extend between the outer section and the upper side of the foundation segment or parallel to the two side faces, wherein the plurality of second sheaths have a curvature that is similar to the inwardly curved outer side.

2. The foundation according to claim 1, further comprising a plurality of segment anchors on the outer section in the region of the ends of the second sheaths for receiving an end of a tension wire for bracing the foundation segment.

3. A wind energy plant comprising:
a wind energy plant foundation including:
a plurality of pre-formed concrete foundation segments, each foundation segment having a plurality of first and second sheaths that are configured to receive tension wires for bracing the foundation segments, wherein each foundation segment has an under side, an upper side configured to receive a lower tower segment of the plurality of foundation segments, an inner side, an outer side having an inward curvature substantially over its entire surface, two side faces and an outer section, wherein the plurality of first sheaths extend parallel to the under side of the foundation segment and the plurality of second sheaths extend between the outer section and the upper side of the foundation segment or parallel to the two side faces, wherein the plurality of second sheaths have a curvature that is similar to the inwardly curved outer side, and
tension wires located in the first and second sheaths, wherein the foundation segments are braced by the tension wires in the first and second sheaths.

4. The wind energy plant according to claim 3 further comprising a lower tower segment placed on the upper side of one or more of the plurality of foundation segments, wherein the lower tower segment is braced together with the plurality of foundation segments by tension wires in the second sheaths.

* * * * *